United States Patent
Özer et al.

(10) Patent No.: US 12,188,786 B2
(45) Date of Patent: Jan. 7, 2025

(54) ENERGY EFFICIENT SMART LABEL WITH AN ELECTRICALLY DESTRUCTIBLE FUSE

(71) Applicant: Arm Limited, Cambridge (GB)

(72) Inventors: Emre Özer, Cambridge (GB); Parameshwarappa Anand Kumar Savanth, Cambridge (GB); Jedrzej Kufel, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/595,880

(22) PCT Filed: Mar. 12, 2020

(86) PCT No.: PCT/GB2020/050618
§ 371 (c)(1),
(2) Date: Nov. 29, 2021

(87) PCT Pub. No.: WO2020/240149
PCT Pub. Date: Dec. 3, 2020

(65) Prior Publication Data
US 2022/0230033 A1    Jul. 21, 2022

(30) Foreign Application Priority Data
May 31, 2019   (GB) ..................................... 1907800

(51) Int. Cl.
*G01D 21/00*       (2006.01)
*G01D 9/00*        (2006.01)
(Continued)

(52) U.S. Cl.
CPC ............. *G01D 21/00* (2013.01); *G01D 9/007* (2021.05); *G06K 7/0008* (2013.01);
(Continued)

(58) Field of Classification Search
CPC .... G01D 21/00; G01D 9/007; G06K 19/0707; G06K 19/0723; G06K 7/0008;
(Continued)

(56) References Cited

U.S. PATENT DOCUMENTS 6,243,245 B1 *   6/2001   Totsuka ................. H01H 85/46
                                              361/103
2004/0075607 A1 *  4/2004   Cathey ............... G06K 19/0726
                                              342/359
(Continued)

FOREIGN PATENT DOCUMENTS

NO    2014/013439 A1    1/2014
WO    2018/206543 A1    11/2018

*Primary Examiner* — Omer S Khan
(74) *Attorney, Agent, or Firm* — NIXON & VANDERHYE P.C.

(57) ABSTRACT

Smart labels, methods of operating smart labels, and associated contexts in which such smart labels may be used are disclosed. The smart label, for use in conjunction with consumer product packaging, comprises an energy harvester to capture ambient energy to provide a source of electrical energy and electronic circuitry powered by the electrical energy. A fuse provides an electrical connection between the energy harvester and the electronic circuitry and destruction of the fuse permanently disconnects the energy harvester from the electronic circuitry. Unnecessary continued operation of the electronic circuitry powered by the energy harvester can therefore be prevented, for example when the consumer product packaging is disposed of or recycled, which may be an undesirable heat source. Smart labelling, and a connected network of smart bins which can read the smart labelling, may also be used to promote consumer recycling of consumer product packaging.

19 Claims, 7 Drawing Sheets

(51) Int. Cl.
  *G06K 7/00*   (2006.01)
  *G06K 7/10*   (2006.01)
  *G06K 19/07*  (2006.01)
  *G09F 3/02*   (2006.01)
  *H02J 50/00*  (2016.01)

(52) U.S. Cl.
  CPC ..... *G06K 7/10366* (2013.01); *G06K 19/0707* (2013.01); *G06K 19/0723* (2013.01); *G09F 3/02* (2013.01); *H02J 50/001* (2020.01); *G09F 2003/0272* (2013.01)

(58) Field of Classification Search
  CPC ........ G06K 7/10366; G09F 2003/0272; G09F 3/02; G09F 3/0291; H02J 50/001; H04Q 2209/47; H04Q 2209/886; H04Q 9/00
  See application file for complete search history.

(56) References Cited

U.S. PATENT DOCUMENTS

| | | | | |
|---|---|---|---|---|
| 2008/0252460 | A1* | 10/2008 | Stobbe | G06K 19/07767 340/572.3 |
| 2010/0214707 | A1* | 8/2010 | Yun | H02J 7/0031 361/92 |
| 2010/0308976 | A1* | 12/2010 | Seban | G06K 19/07345 340/10.5 |
| 2012/0089207 | A1* | 4/2012 | Chen | A61N 5/0601 607/92 |
| 2015/0307245 | A1* | 10/2015 | Puccini | G06K 7/00 702/130 |
| 2016/0341532 | A1* | 11/2016 | Owen | F42C 17/04 |
| 2019/0354828 | A1* | 11/2019 | Neuneker | G06K 19/07345 |

* cited by examiner

ENERGY EFFICIENT SMART LABEL WITH AN ELECTRICALLY DESTRUCTIBLE FUSE

The present techniques relate to the use of smart labels associated with packaging.

Packaging for consumer goods may be provided with a "smart label" which comprises relatively simple data electronics powered by an energy harvester. The smart label may for example be equipped with a data processor, one or more sensors, some memory capacity, a means of communication such as an RF-ID tag, and so on. This enables the smart label to perform useful roles both for the user and for the manufacturer, such as when involved in stock monitoring (for the manufacturer), and monitoring the state of the packaging and/or its contents (e.g. temperature monitoring). Energy harvesters may gather ambient energy in a variety of ways, such as from ambient sunlight, ambient thermal energy, ambient kinetic energy, and so on. Once activated by the manufacturer, such smart label electronics remains active as long as the required source of ambient energy is present and the natural degradation of the physical structure of the electronics does not render it unusable.

At least some examples provide an apparatus for use in conjunction with consumer product packaging comprising: an energy harvester to capture ambient energy to provide a source of electrical energy; electronic circuitry powered by the electrical energy; and a fuse providing an electrical connection between the energy harvester and the electronic circuitry, wherein destruction of the fuse permanently disconnects the energy harvester from the electronic circuitry.

At least some examples provide a method of operating an apparatus for attachment to consumer product packaging comprising: capturing ambient energy using an energy harvester to provide a source of electrical energy; operating electronic circuitry powered by the electrical energy, wherein an electrical connection between the energy harvester and the electronic circuitry is provided by a fuse; and destroying the fuse to permanently disconnect the energy harvester from the electronic circuitry.

The present techniques will be described further, by way of example only, with reference to embodiments thereof as illustrated in the accompanying drawings, to be read in conjunction with the following description, in which.

In one example herein there is an apparatus for use in conjunction with consumer product packaging comprising: an energy harvester to capture ambient energy to provide a source of electrical energy; electronic circuitry powered by the electrical energy; and a fuse providing an electrical connection between the energy harvester and the electronic circuitry, wherein destruction of the fuse permanently disconnects the energy harvester from the electronic circuitry.

The inventors of the present techniques have recognised that in a smart label which has an energy harvester arranged to capture ambient energy in order to power electronics provided as part of the smart label, the work done by the electronics once the packaging to which the label is attached has been disposed of is unlikely to be useful and therefore the energy from the energy harvester is merely dissipated as heat. Although of course the amounts of energy under consideration for an individual smart label are very small, it is expected that such smart labels will become evermore widespread and therefore a great number of such "smart products", i.e. packaging with an attached smart label will be disposed of. Accordingly, such disposed-of smart labels would continue to harvest energy and generate heat. Even if the packaging is recycled, there may still be a substantial period when an item of packaging may be waiting for processing and generating heat. Indeed, if such packaging is not recycled and is destined for landfill, then this period of generating useless heat may continue for a considerable period of time, even extending into years. Not only is this a waste of energy, but moreover it is conceivable that it could represent a fire risk, for example where many such smart labels are collected together in a recycling centre or in a landfill site. In this context, the inventors of the present techniques propose that such smart labels comprise a fuse which connect the energy harvester to the remaining electronics of the smart label and where destruction of the fuse permanently disconnects the energy harvester from that electronics. It should be noted therefore that the smart label is provided with a fuse which is expected and intended to be destroyed, but at an appropriate future time point after manufacture, which may be determined by the device (i.e. the smart label) itself, by the user, or by a third party device, as will be discussed in more detail below. Accordingly, the effect is that once the fuse is destroyed the electronics cannot operate since no electrical energy is generated by the energy harvester, and the smart label therefore is no longer a heat source.

As mentioned above, there are a variety of ways in which the fuse may be arranged to be destroyed, and indeed particular embodiments may comprise one or more of such mechanisms. For example in some embodiments the electrical connection between the energy harvester and the electronic circuitry is arranged to be manually breakable to cause said destruction of the fuse at a termination point in time chosen by a user. For example, where such a smart label may be provided as a thin, possibly printed, label on the surface of packaging, part or all of the fuse may be formed to incorporate a then, peelable label (e.g. where part of that peelable portion crosses an electrical connection). Thus, when the user chooses to destroy the fuse, i.e. the intention is that this should take place at the point at which the user disposes of the packaging to which the smart label is attached, the user peels off this portion, breaking the electrical connection and thus destroying the fuse.

The electronic circuitry can comprise a great variety of components, and there may be any number (small or large) of such components. In some embodiments the electronic circuitry comprises data processing circuitry. This supports the "smart" characteristic of the smart label, enabling a great range of functionality and behaviour. Thus, this data processing circuitry may be very simple (to the extent of essentially being a simple finite state machine) through to being a highly configurable and capable microprocessor.

The smart label may alternatively, or in addition, be provided with the capability to electronically destroy its own fuse. This then enables the smart label to destroy the fuse in response to one or more predetermined conditions, which may for example have been predetermined to be indicative of disposal or other equivalent "end of life" of the packaging. Accordingly, in some embodiments the electrical connection between the energy harvester and the electronic circuitry is arranged to automatically break to cause said destruction of the fuse in response to a trigger signal generated by the data processing circuitry.

The electronic circuitry may comprise data storage circuitry.

The data processing circuitry may be arranged to generate the trigger signal to cause destruction of the fuse in response to a variety of different inputs, but in some embodiments the apparatus comprises at least one sensor to provide at least one sensor input to the data processing circuitry, wherein the data processing circuitry is arranged to generate the trigger signal in dependence on the at least one sensor input. The smart label can be provided with one or more sensors in order for it to provide the user, the retailer, or the manufacturer with useful information and an input to the data processing circuitry from one of these sensors may provide suitable information on which to base the trigger for the destruction of the fuse. Alternatively, or in addition, the apparatus may be provided with at least one sensor which is provided solely for the purpose of identifying the "disposal" or "end of life" moment for the packaging to which the smart label is attached in order to generate the trigger signal.

Some embodiments further comprise at least one analogue-to-digital convertor to convert an analogue output of the at least one sensor into at least one digital sensor input to the data processing circuitry.

Accordingly, the at least one sensor may be arranged to provide a range of different information, however, in some embodiments the at least one sensor is arranged to provide information relating to content of the packaging. There are a range of ways in which information about the content of the packaging may be appropriate to determine the moment at which it is appropriate to destroy the fuse.

For example, in some embodiments the at least one sensor comprises at least one chemical sensor. Such a chemical sensor may be provided in order that the smart label can provide, say, the user with useful information about the state of the content of the packaging.

Moreover, in some embodiments the content of the packaging comprises perishable goods and the information relating to the content of the packaging comprises a state of deterioration of the perishable goods. Accordingly, the output of the chemical sensor can be arranged to provide information to the data processing circuitry indicative of the state of deterioration of the perishable goods. This can for example comprise a state of deterioration of edible goods and in particular to then allow identification of a time point at which the edible goods are determined to be no longer edible and therefore the time point at which firstly the packaging (including its inedible contents) should be thrown away and also therefore that the point has come for the energy harvester to be permanently disconnected from the rest of the electronics.

In some embodiments the at least one sensor comprises at least one physical presence sensor. This physical presence, in relation to the content of the packaging, may for example indicate how full a container is. This fullness may be graded, ranging from completely full down to completely empty, or may be binary in the sense of it only indicating "full/not full" or "empty/not empty". This therefore enables the data processing circuitry to base its determination of the time point when the fuse should be electrically destroyed on the basis of physical presence of content.

For example, the content of the packaging may comprise consumable goods and the information relating to the content of the packaging comprises an extent of consumption of the consumable goods. Hence, regardless of whether the packaging has yet been thrown away or recycled, the data processing circuitry may be arranged to recognise when the packaging is empty (its contents have been substantially consumed) and at this point to disconnect the energy harvester from the remainder of the electronics of the smart label.

The data processing circuitry may alternatively, or in addition, base its determination of when to generate the trigger signal on other information and in some embodiments the data processing circuitry is arranged to generate the trigger signal in dependence on an internal state of the data processing circuitry.

This internal state may take a variety of forms, but in some embodiments the data processing circuitry comprises a clock and the internal state of the data processing circuitry comprises a timing indication generated by the clock. Accordingly, therefore the data processing circuitry can be arranged to generate the trigger signal when a particular moment in time has arrived, for example, a maximum allowed shelf-life or "best-before" date of a consumable product. It should be noted that the "clock" does not need to generate a true clock signal and this could for example be provided as a counter which might, say, be incremented each time the data processor performs a particular action, and once this counter reaches a particular value this might be determined to be the required "timing indication" and the data processing circuitry can then generate the trigger signal in response.

Alternatively, or in addition, the data processing circuitry may also respond to other signals in order to generate the trigger signal. In some embodiments the data processing circuitry is arranged to generate the trigger signal in dependence on an externally generated signal received by the data processing circuitry. This therefore usefully provides the possibility for the smart label to trigger its fuse destruction in response to other signals relating to various factors relating to the use of the packaging.

In some embodiments the electronic circuitry comprises radio-frequency communications circuitry and the externally generated signal is received by the data processing circuitry via the radio-frequency communications circuitry. Accordingly, this provides the smart label with the ability to be "triggered" in order to destroy its own fuse on the basis of a non-contact signal received. For example, where this signal is received via radio-frequency communications, a variety of external devices may then be configured in order to allow a user, or indeed another participant in the wider system of recycling packaging, to trigger the fuse destruction. For example, a user might trigger this by means of an app running on her mobile phone, whilst a recycling facility might generate this signal from a dedicated antenna close to which the packaging must pass when it is received to be recycled.

Various technologies may be envisaged for this communication with the apparatus and the present techniques are not limited to any particular variety of radio communication or communication protocol. However, in some embodiments the radio-frequency communications circuitry is radio-frequency identification circuitry. Where radio frequency identification circuitry (RFID) technologies are commonly implemented in connection with such smart labels, the extension of this to incorporate the present techniques allows for an efficient manufacturing process.

In some embodiments the radio-frequency identification circuitry is arranged to operate at ultra-high radio frequencies. This in particular allows the communication to take place across a relatively large distance, such that, for example, when packaging comprising a smart label is disclosed of, the source of the signal which should cause it to trigger the fuse destruction does not need to be very close.

In some embodiments the radio-frequency communications circuitry is near-field communication circuitry.

As mentioned above the externally generated signal may be generated on the basis of a variety of circumstances, including where the packaging is and accordingly in some embodiments the externally generated signal is indicative of a location of the apparatus.

In some embodiments the location of the apparatus is indicative that the packaging has been disposed of. For example, this may be provided in circumstances where the external signal is generated near the periphery of a recycling bin, such that when the packaging enters the bin the smart label is triggered to destroy its own fuse. This could also be the situation where the packaging enters a recycling facility.

The present techniques may be manufactured in a variety of ways, but where such electronics, provided as part of smart labelling, is intentionally expected to eventually be disposed of, and where the packaging itself may be plastic based, "plastic electronics" may be used as the basis for the label. Accordingly, in some embodiments the apparatus is formed as a plastic-based electronic device. The apparatus may be formed as an organic electronic device. The apparatus may be formed as a biodegradable electronic device. Alternatively, more traditional electronics manufacturing techniques may be employed and accordingly in some embodiments the apparatus is formed as a silicon-based electronic device.

In one example herein there is a method of operating an apparatus for attachment to consumer product packaging comprising: capturing ambient energy using an energy harvester to provide a source of electrical energy; operating electronic circuitry powered by the electrical energy, wherein an electrical connection between the energy harvester and the electronic circuitry is provided by a fuse; and destroying the fuse to permanently disconnect the energy harvester from the electronic circuitry.

Some particular embodiments are now described with reference to the figures.

Figure 1A:
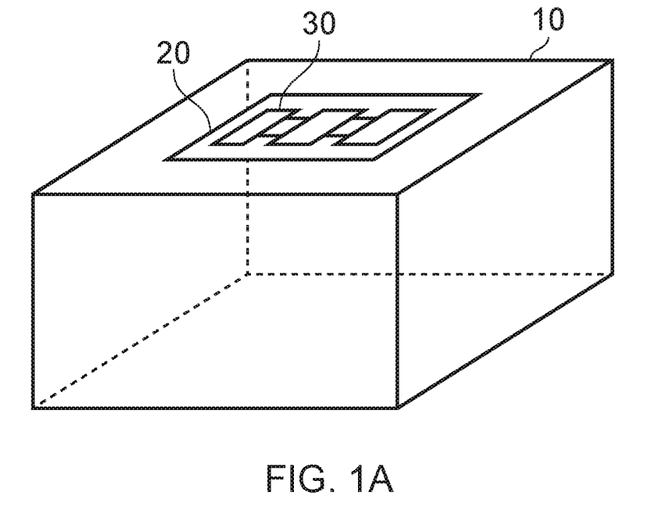
FIG. 1A schematically illustrates packaging with a smart label attached in some example embodiments.

FIG. 1A schematically illustrates packaging 10 which is provided with a smart label 20 attached to one of its surfaces. This smart label comprises various electronics 30, which may for example be printed electronics. Further detail of the configuration of the electronics 30 of smart label 20 in various respective embodiments will be described with reference to the figures which follow.

Figure 1B:
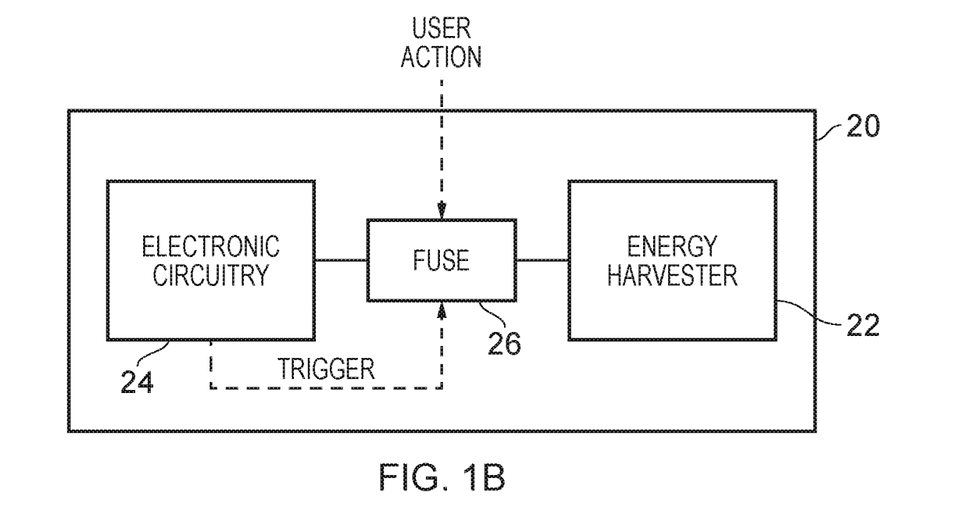
FIG. 1B schematically illustrates a smart label in more detail in some example embodiments.

FIG. 1B schematically illustrates the smart label 20 in more detail. The smart label 20 comprises an energy harvester 22 which gathers ambient energy and converts it into electrical energy to provide an electrical power source for electronic circuitry 24. The electronic circuitry 24 may be variously configured in dependence on the particular type of smart label, but can comprise a data processor and a sensor or sensors to provide information about the environment in which the smart label is currently situated and/or the content of the packaging to which the smart label is attached. FIG. 1B particularly illustrates that the energy harvester 22 is connected to the electronic circuitry 24 by means of fuse 26. Moreover, this fuse 26 is arranged in such a manner that it can, at a suitable point in time, intentionally be destroyed in order to permanently disconnect the energy harvester from the electronic circuitry 24. As illustrated by the dashed line in FIG. 1B, this destruction of the fuse 26 may be caused by user action and/or by a trigger signal generated by the electronic circuitry 24.

Figure 2A:
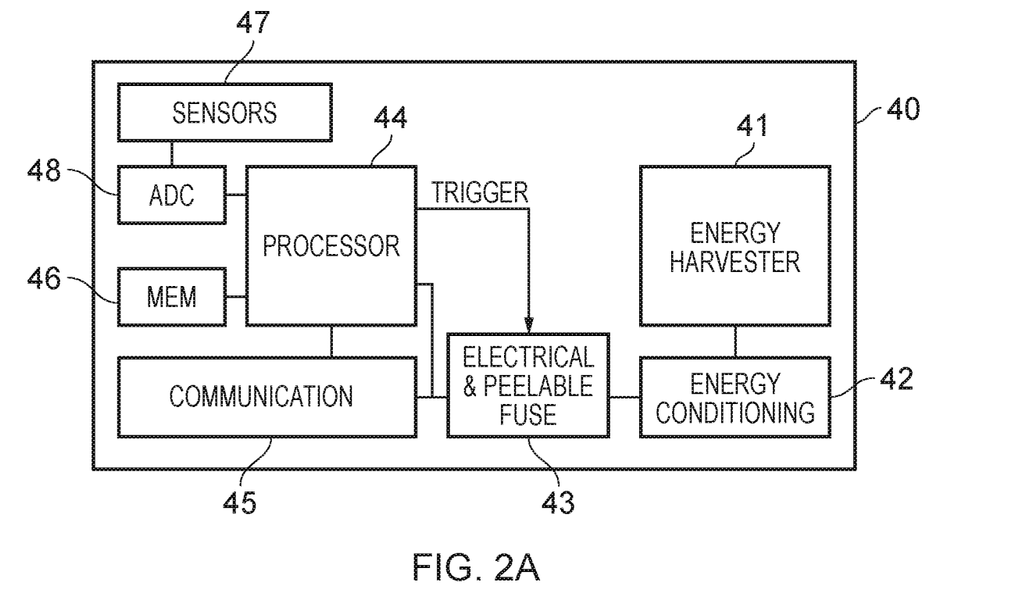
FIG. 2A schematically illustrates a smart label in more detail in some example embodiments.

FIG. 2A schematically illustrates a smart label 40 in some example embodiments. The energy harvester 41 gathers ambient energy and converts this into electrical energy. This may for example therefore be a photovoltaic cell, a piezoelectric device, a thermal energy gatherer, and RF energy gatherer, and so on. Electrical energy generated by the energy harvester 41 is conditioned by the energy conditioning circuitry 42, which in some embodiments is a rectifier. It may instead be a more complex maximum power point tracking circuit, etc. The electrical power from the energy conditioning circuit 42 is connected to the electrical and the peelable fuse 43. It is therefore to be understood that the electrical connection which the fuse 43 provides between the energy harvester and the electronic circuitry (i.e. here the data processing circuitry and other components) can be destroyed either electrically (by a trigger signal generated by the processor 44) or by removal of a physically peelable portion which the user can choose to peel off and thus destroy the fuse. The electronic circuitry of the smart label 40 illustrated in FIG. 2A not only comprises the processor 44, but also communication circuitry 45, a memory 46 to which the processor 44 has access, and sensors 47, the output of which is converted by the analogue-to-digital converters (ADC) 48. The user can choose to peel off the portion of the fuse 43 and cause its destruction, but also the processor 44, in dependence on information it receives from the sensors 47, the memory 46, and/or the communication circuitry 45 can determine when to generate a trigger signal to destroy the electrically destroyable fuse 43.

Figure 2B:
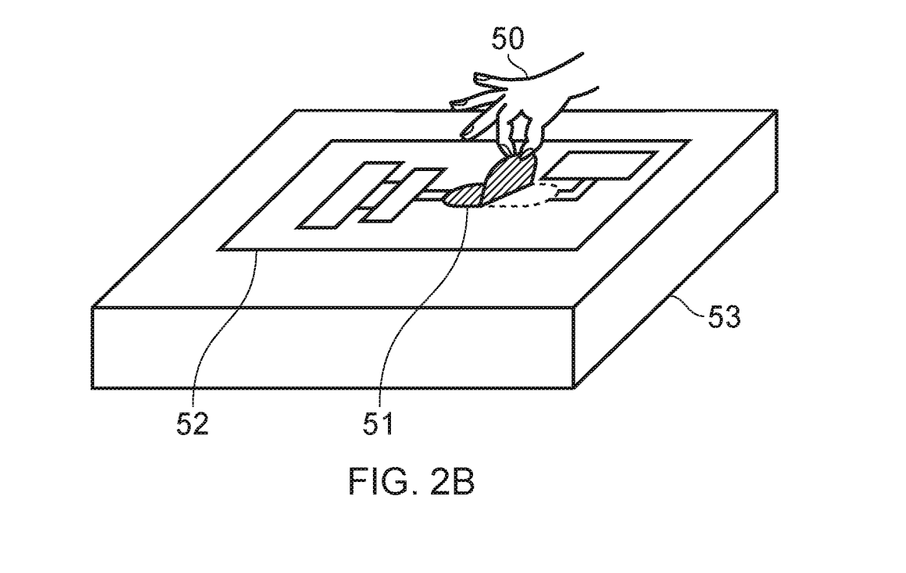
FIG. 2B schematically illustrates a user peeling off a small tab in order to destroy the fuse of a smart label in some example embodiments.

FIG. 2B schematically illustrates (not necessarily to scale) a user 50 peeling off a portion 51 of a peelable fuse which forms part of a smart label 52 attached to packaging 53. For example, the user may do this immediately before putting the packaging 53 into a recycling bin. Labelling on the smart label or packaging may instruct the user to do this.

Figure 3A:
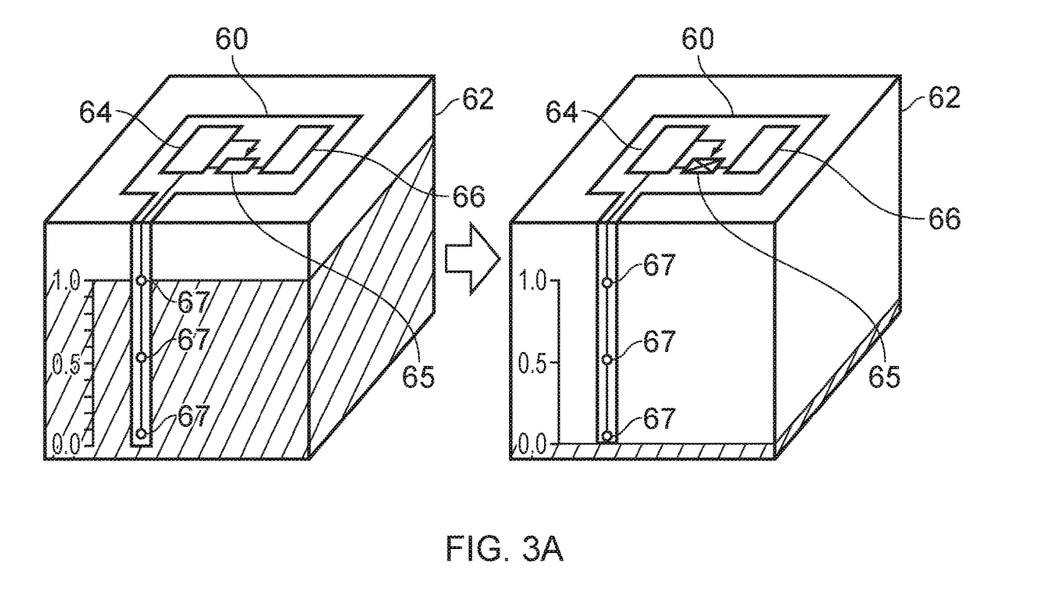
FIG. 3A schematically illustrates the operation of a smart label which monitors the fullness of packaging and initiates electronic destruction of its own fuse when the packaging is determined to be substantially empty in some example embodiments.

FIG. 3A schematically illustrates a smart label 60 according to some embodiments attached to packaging 62. The smart label 60 is provided with at least one sensor 67 which enables it to determine the extent to which the content of the packaging 62 has been consumed. For example, in the case of the illustration of FIG. 3A, the packaging 62 is provided for the purpose of holding liquid and at the time point illustrated on the left of FIG. 3A it can be seen that the packaging is essentially full, where the scale indicates a fluid level of "1.0". After a period of consumer use the time point on the right of FIG. 3A is reached, where it can be seen that the packaging 62 is now essentially empty, where the scale indicates a fluid level of "0.0". The sensor or sensors 67 of the smart label 60 provide the data processing circuitry 64 with a corresponding input or inputs, which enable the data processing circuitry to determine with sufficient confidence that the packaging 62 is now empty. In response to this the data processing circuitry 64 of the smart label 60 generates the trigger signal to the fuse 65, which is destroyed as a result, meaning that the energy harvester 66 is permanently disconnected from the electronics of the smart label 60. The final act of the data processing circuitry 64 before generating the trigger signal may for example be to cause a visual aspect of the label to permanently (i.e. not needing further electrical power to be maintained) indicate "EMPTY".

Figure 3B:
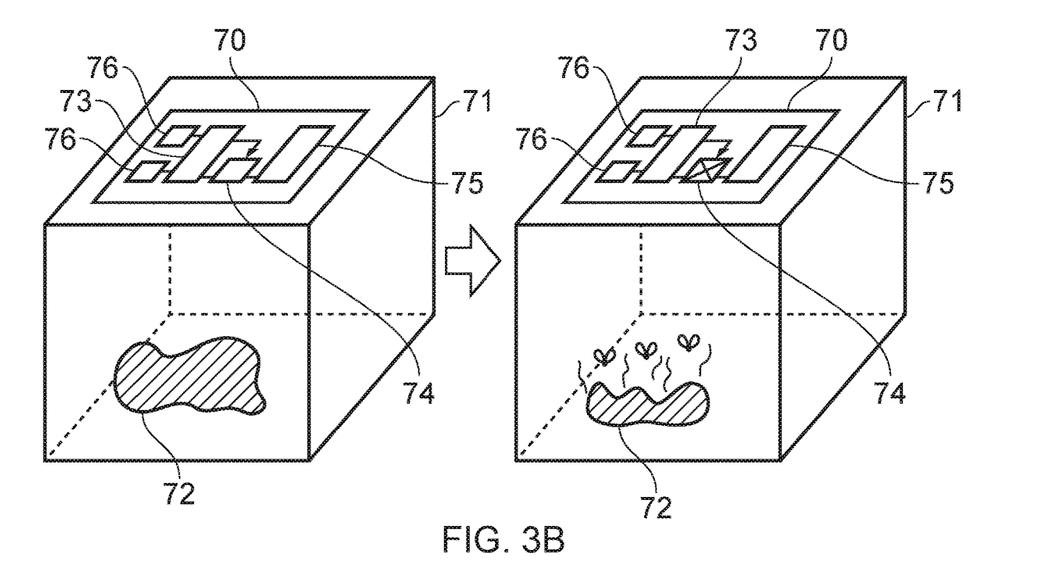
FIG. 3B schematically operates the operation of a smart label which monitors the state of the content of packaging using chemical sensors and triggers the destruction of its own fuse in response to a determination that the content has deteriorated in some example embodiments.

FIG. 3B schematically illustrates packaging 71 with an attached smart label 70, where the packaging 71 comprises a perishable food item 72. The smart label 70 comprises data processing circuitry 73, an electronically destroyable fuse 74, and an energy harvester 75. A pair of chemical sensors 76 provide the data processing circuitry 73 with information about the current state of deterioration of the food item 72. Hence, after a period of time has elapsed the illustration on the right of FIG. 3B shows that the food item 72 has now deteriorated to the point at which it should not be consumed. Chemicals associated with this deterioration of the food item 72 are detected by the sensors 76 and corresponding sensor inputs are received by the data processing circuitry 73. The data processing circuitry 73 thus identifies that the food item 72 has perished and that the entire package (i.e. including the packaging 71, the food item 72 and the attached smart label 70) should now be promptly disposed of and triggers the electronic destruction of the fuse 74, such that the energy harvester 75 is permanently disconnected from the remainder of the electronics of the smart label 70. The final act of the data processing circuitry 73 before generating the trigger signal may for example be to cause a visual aspect of the label to permanently (i.e. not needing further electrical power to be maintained) and prominently indicate "DO NOT CONSUME".

Figure 4A:
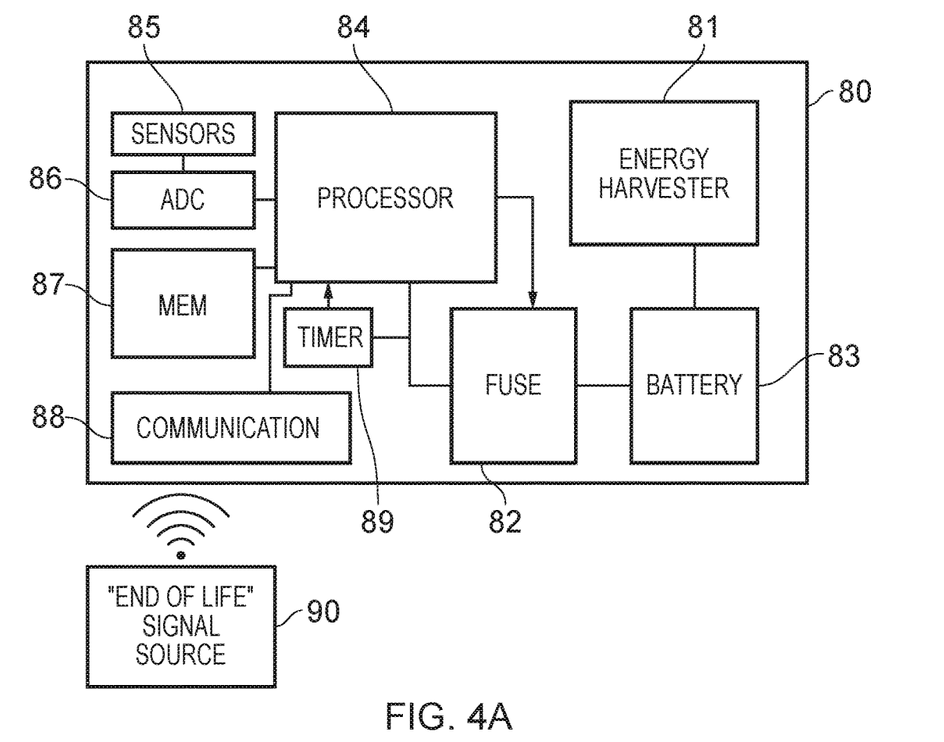
FIG. 4A schematically illustrates a smart label which is responsive to a signal received from an external device in order to electronically destroy its own fuse in some example embodiments.

FIG. 4A schematically illustrates a smart label 80 in some example embodiments. Smart label 80 comprises an energy harvester 81, an electronically destroyable fuse 82, a battery 83, and a processor 84. The ambient energy gathered by the energy harvester 81 is stored in the printed battery 83. The printed battery 83 is not essential, since electrical power may be taken directly from the energy harvester 81, but an intermediate battery can help to smooth out fluctuations in the energy available (e.g. overnight from a solar cell). The printed battery 83 thus provides an energy source, via the fuse 82 for the processor 84 and the other electronic components. Sensors 85 are coupled to the processor 84 via the ADC 86. The processor 84 has a small memory 87 attached and is also connected to communication circuitry 88. A timer circuitry 89 also provides a further input to the processor 84. The processor 84 is arranged to be responsive to a number of different signals on the basis of which it may generate the trigger signal which causes the permanent destruction of the fuse 82. One signal on the basis of which the processor 84 may generate the trigger signal comprises inputs from the sensors 85, for example as described above with reference to the example embodiments of FIGS. 3A and 3B. Additionally, where in this embodiment the processor 84 also receives an input from the timer 89 which is configured such that the timing indication periodically and monotonically increases, the processor 84 will generate the trigger signal when the timer signal reaches a predetermined value. This value is associated with a given shelf life of the product contained in the packaging to which the smart label 80 is attached. Additionally (in this embodiment but alternatively in others) the communication circuitry 88 is arranged to receive a radio frequency signal from external source 90. The radio-frequency communication capability of the smart label 80 provided by the communication circuitry 88 may provide the smart label 80 with various functionalities, for example in stock management for the manufacturer of the corresponding product, or for a retailer selling the product to a customer, but of particular interest here is the ability of the communication circuitry 88 to receive an "end of life" signal from an external source. On receipt of this signal, communicated further to the processor 84, the processor 84 generates the trigger signal and destroys the fuse 82. This "end of life" signal source may take various forms.

Figure 4B:
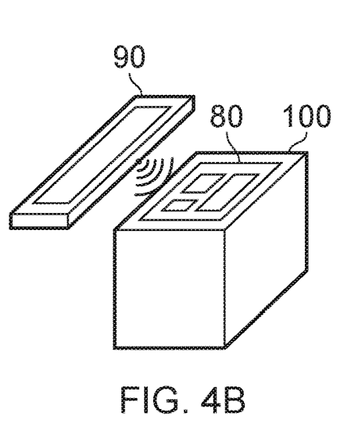
FIG. 4B schematically illustrates a mobile phone being used to send an "end of life" signal to a smart label in some example embodiments.

FIG. 4B schematically illustrates one example embodiment, in which the smart label 80 of FIG. 4A, attached to packaging 100 is caused to trigger the fuse destruction in response to a signal received wirelessly from a mobile telephone 90 operated by a user. For example, the user of the mobile phone 90 may have access to an app which causes the appropriate signal to be generated for reception by the communication circuitry 88 in order to cause the processor 84 to generate the fuse destruction trigger signal. Thus, the user is provided with the ability to selectively "turn off" the smart packaging immediately before recycling the packaging 100.

Figure 4C:
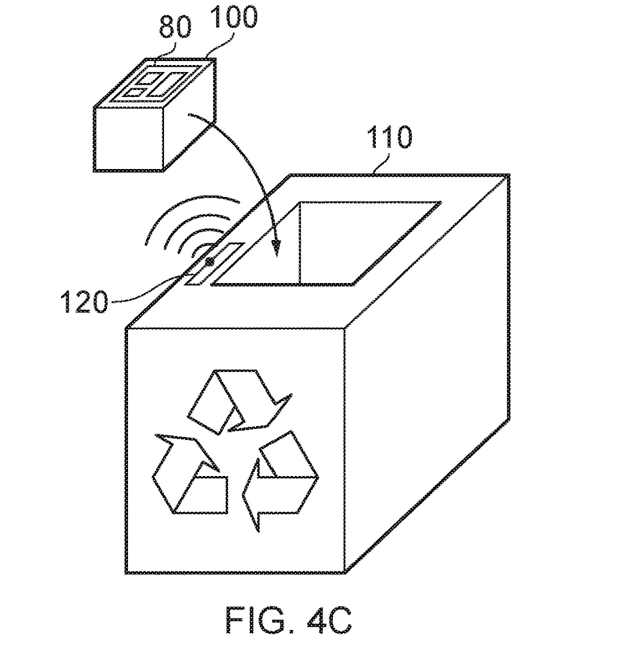
FIG. 4C schematically illustrates packaging being disposed of in a recycling bin which signals to the smart label on the packaging that it should electronically destroy its own fuse in some example embodiments.

FIG. 4C schematically illustrates another use example of the smart label 80 attached to the packaging 100, where in this example the packaging is being put into a recycling bin 110. On the rim of the recycling bin is a source of the predetermined "end of life" signal 120, such that when the packaging 100 is placed into the recycling bin 110, the communication circuitry 88 of the smart label 80 detects the "end of life" signal from the wireless communications circuitry 120 of the recycling bin 110, and the last action of the smart label 80 is to destroy its own fuse as it enters the recycling bin 110.

Figure 5:
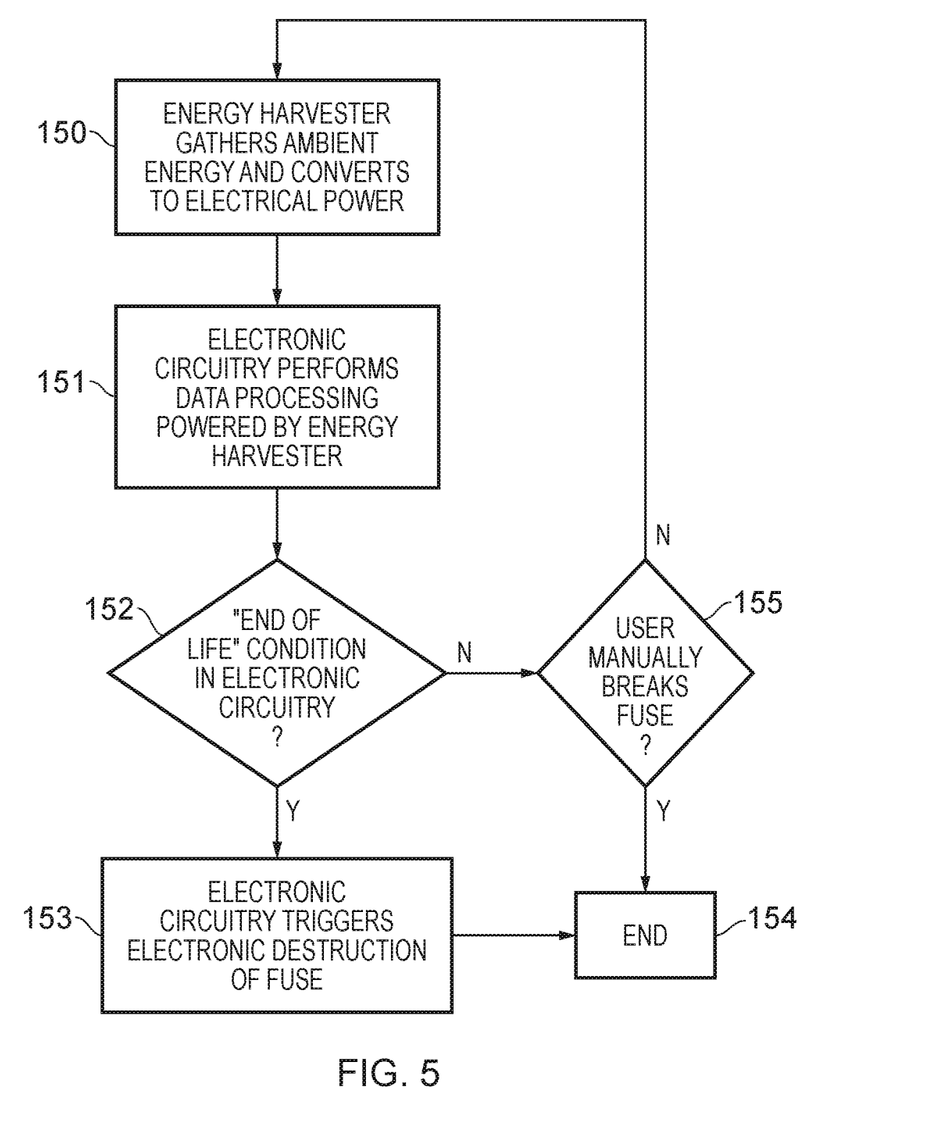
FIG. 5 is a flow diagram showing a sequence of steps which are taken according to the method of some embodiments when operating a smart label.

FIG. 5 is a flow diagram showing a sequence of steps which are taken according to the method of some embodiments when operating a smart label according to the present techniques. The flow can be considered to begin at step 150 where the energy harvester of the smart label gathers ambient energy and converts this into electrical power. Then at step 151 the electronic circuitry of the smart label performs data processing powered by the electrical energy gathered by the energy harvester. It is determined at step 152 if an "end of life" condition is present in the electronic circuitry, i.e. if the electronic circuitry has determined either on the basis of some kind of internal state, or on the basis of information received from another part (e.g. a sensor) of the smart label, or in response to a signal received from an external source, that the packaging has reached the end of its life and the smart label should be turned off. If this is the case, then the flow proceeds to step 153 where the electronic circuitry triggers the electronic destruction of the fuse of the smart label and the flow ends at step 154. Alternatively, returning to a consideration at step 152 if this end of life condition is not present, then it may be determined at step 155 if the user manually breaks the fuse. If the user does manually break the fuse, then the process also ends at step 154, however, otherwise the flow returns to step 150 and the energy harvester continues gathering energy and the electronic circuitry continues performing its data processing.

Figure 6:
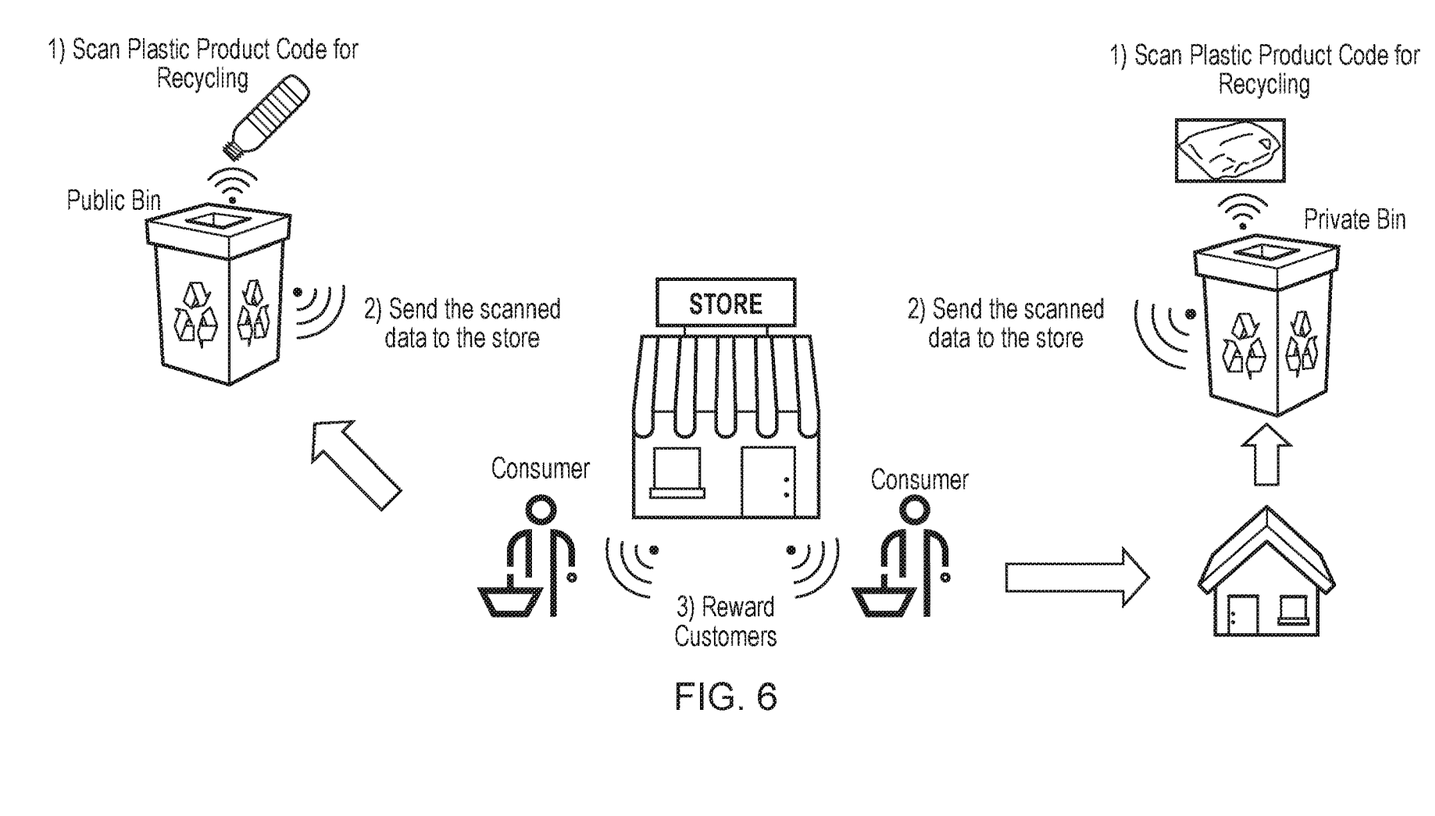
FIG. 6 schematically illustrates a system for encouraging consumers to recycle packaging provided with smart labels in some example embodiments.

FIG. 6 shows an associated recycling system. The use of smart labels on consumer product packaging encourages consumers to recycle the smart-labelled packaging. Although environmentally-conscious consumers may recycle whether there is an incentive for recycling there or not, this technique can cause those consumers that normally do not recycle, for whatever reason, to do so. This may be achieved by rewarding consumers who recycle, and this can be done automatically by retail stores when consumers recycle plastic packages by putting them into a smart recycle bin equipped to detect that the plastic package has been recycled by the consumer. A smart bin (whether public or private) equipped with a smart label reading capability can detect if a single package is disposed by reading an identifier (ID/tag) e.g. through RFID/NFC. It may also be arranged to read multiple smart labels in a fast manner (i.e. in a few seconds), if multiple smart packages are disposed of at one time. The smart bin can record the IDs of the recycled product packages, contact the retail store through its internet/cloud interface, and indicate which product packages have been recycled by the consumer(s), so that the retail store can match the identifiers of the recycled packages to the e.g. tag IDs of the product at the sale point, and then reward the recycling action in some way, e.g. with store credit or direct payment to the customer who paid by card. Similarly, a smart bin (whether public or private) can detect that an individual recyclable plastic package is being disposed of by a consumer by reading its smart label tag, and warn the consumer visually on a display on the bin and/or with audio on the bin if the consumer is about to put the packaging into the wrong compartment (e.g. a general waste section), in order to divert the disposal direction to the recycling section. In any of these configurations, once the smart bin has gathered the necessary identifier from a given smart label, it may trigger the smart label to destroy its own fuse as it enters the recycling bin, as described in more detail above with reference to the preceding figures.

Figure 7:
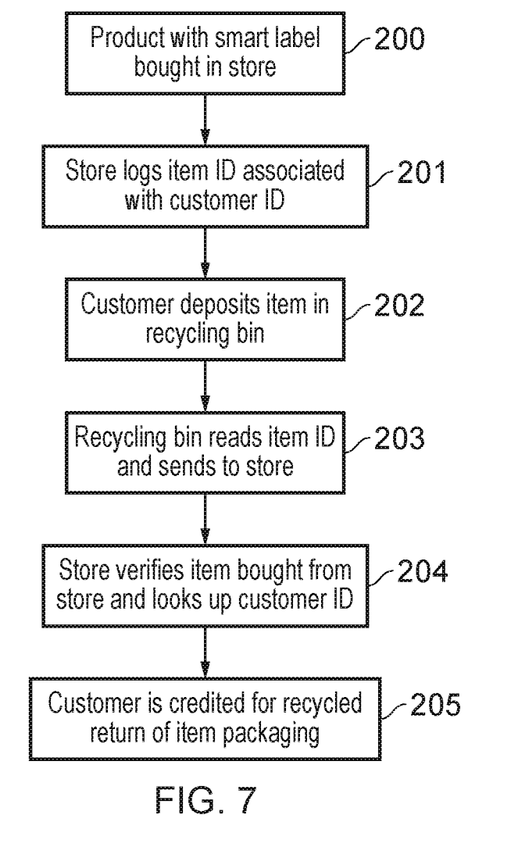
FIG. 7 is a sequence of steps which are taken according to the method of some example embodiments when encouraging consumers to recycle packaging provided with smart labels.

FIG. 7 is a flow diagram showing a sequence of steps which are taken association with the recycling system of FIG. 6. At step 200 a product labelled with a smart label is bought from a store. Then at step 201 the store logs, in association with an identifier of the purchasing customer, an identifier derived from the smart label for the individual product. Later, at step 202 the customer deposits the packaging in a smart recycling bin, which at step 203 reads the product identifier derived from the smart label and sends this information to the store. On receipt of this information at step 204 the store verifies that this individual product was bought from the store and looks up the associated identifier of the purchasing customer. Finally at step 205 the customer is then rewarded in some manner, for example by allocation of a corresponding store credit, for having recycled the packaging.

In brief overall summary, smart labels, methods of operating smart labels, and associated contexts in which such smart labels may be used are disclosed. The smart label, for use in conjunction with consumer product packaging, comprises an energy harvester to capture ambient energy to provide a source of electrical energy and electronic circuitry powered by the electrical energy. A fuse provides an electrical connection between the energy harvester and the electronic circuitry and destruction of the fuse permanently disconnects the energy harvester from the electronic circuitry. Unnecessary continued operation of the electronic circuitry powered by the energy harvester can therefore be prevented, for example when the consumer product packaging is disposed of or recycled, which may be an undesirable heat source. Smart labelling, and a connected network of smart bins which can read the smart labelling, may also be used to promote consumer recycling of consumer product packaging.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus for use in conjunction with consumer product packaging comprising:
   an energy harvester to capture ambient energy to provide a source of electrical energy;
   electronic circuitry powered by the electrical energy, wherein the electronic circuitry comprises a data processor; and
   an electrically destroyable fuse providing an electrical connection between the energy harvester and the electronic circuitry,
   wherein destruction of the electrically destroyable fuse permanently disconnects the energy harvester from the electronic circuitry, such that the electronic circuitry cannot operate, and
   wherein the data processor is configured to break the electrical connection between the energy harvester and the electronic circuitry by generating an electrical trigger signal to cause said destruction of the electrically destroyable fuse.

2. The apparatus as claimed in claim 1, wherein the electrical connection between the energy harvester and the electronic circuitry is arranged to be manually breakable to cause said destruction of the electrically destroyable fuse at a termination point in time chosen by a user.

3. The apparatus as claimed in claim 1, wherein the electronic circuitry comprises data storage circuitry, and further comprising at least one sensor to provide at least one sensor input to the data processor, wherein the data processor is arranged to generate the electrical trigger signal in dependence on the at least one sensor input.

4. The apparatus as claimed in claim 3, further comprising at least one analogue-to-digital convertor to convert an analogue output of the at least one sensor into at least one digital sensor input to the data processor.

5. The apparatus as claimed in claim 3, wherein the at least one sensor is arranged to provide information relating to content of the packaging.

6. The apparatus as claimed in claim 5, wherein the at least one sensor comprises at least one chemical sensor.

7. The apparatus as claimed in claim 6, wherein the content of the packaging comprises perishable goods and the information relating to the content of the packaging comprises a state of deterioration of the perishable goods.

8. The apparatus as claimed in claim 3, wherein the at least one sensor comprises at least one physical presence sensor.

9. The apparatus as claimed in claim 8, wherein the content of the packaging comprises consumable goods and the information relating to the content of the packaging comprises an extent of consumption of the consumable goods.

10. The apparatus as claimed in claim 1, wherein the data processor is arranged to generate the electrical trigger signal in dependence on an internal state of the data processor.

11. The apparatus as claimed in claim 10, wherein the data processor comprises a clock and the internal state of the data processor comprises a timing indication generated by the clock.

12. The apparatus as claimed in claim 1, wherein the data processor is arranged to generate the electrical trigger signal in dependence on an externally generated signal received by the data processor.

13. The apparatus as claimed in claim 12, wherein the electronic circuitry comprises a radio receiver and wherein the externally generated signal is received by the data processor via the radio receiver and the radio receiver is configured to identify a radio frequency of the externally generated signal.

14. The apparatus as claimed in claim 13, wherein the radio receiver is arranged to operate at ultra-high radio frequencies or is near-field communication circuitry.

15. The apparatus as claimed in claim 12, wherein the externally generated signal is indicative of a location of the apparatus.

16. The apparatus as claimed in claim 14, wherein the location of the apparatus is indicative that the packaging has been disposed of.

17. The apparatus as claimed in claim 1, wherein the apparatus is formed as at least one of:
a plastic-based electronic device;
an organic electronic device;
a biodegradable electronic device.

18. The apparatus as claimed in claim 1, wherein the apparatus is formed as a silicon-based electronic device.

19. A method of operating an apparatus for attachment to consumer product packaging comprising:
capturing ambient energy using an energy harvester to provide a source of electrical energy;
operating electronic circuitry powered by the electrical energy, wherein the electronic circuitry comprises a data processor, and wherein an electrical connection between the energy harvester and the electronic circuitry is provided by an electrically destroyable fuse;
breaking the electrical connection between the energy harvester and the electronic circuitry by generating an electrical trigger signal by the data processor to destroy the electrically destroyable fuse to permanently disconnect the energy harvester from the electronic circuitry, such that the electronic circuitry cannot operate.

* * * * *